United States Patent
Ford

[15] 3,684,068
[45] Aug. 15, 1972

[54] ELECTROMECHANICAL CLUTCH
[72] Inventor: Frederick M. Ford, Carpentersville, Ill.
[73] Assignee: Oak Electro/Netics Corp., Crystal Lake, Ill.
[22] Filed: March 30, 1971
[21] Appl. No.: 129,403

[52] U.S. Cl. .................. 192/84 T, 192/37, 192/415, 192/81 C
[51] Int. Cl. ...................... F16d 13/08, F16d 41/20
[58] Field of Search............ 192/37, 41 S, 81 C, 84 T; 188/163

[56] References Cited
UNITED STATES PATENTS

| | | |
|---|---|---|
| 2,523,772 | 9/1950 | McGibbon et al....192/41 S X |
| 2,976,976 | 3/1961 | Parker..................192/41 S X |
| 3,006,448 | 10/1961 | Fox.......................192/41 S X |
| 3,185,276 | 5/1965 | Sajovel, Jr...............192/84 T |

Primary Examiner—Allan D. Herrmann
Attorney—Parker, Carter & Markey

[57] ABSTRACT

An electromagnetic clutch for coupling a normally continuously running input shaft to a normally stationary output shaft. A coil spring is wound about portions of the input and output shafts and forms the driving connection therebetween. An electromagnet is concentric with the input and output shafts and has a movable armature normally engaging the spring and preventing its rotation. The spring only forms a driving connection between the input and output shafts at such time as it is released by the armature.

13 Claims, 4 Drawing Figures

INVENTOR.
Frederick M. Ford
BY Parker, Carter & Markey
Attorneys.

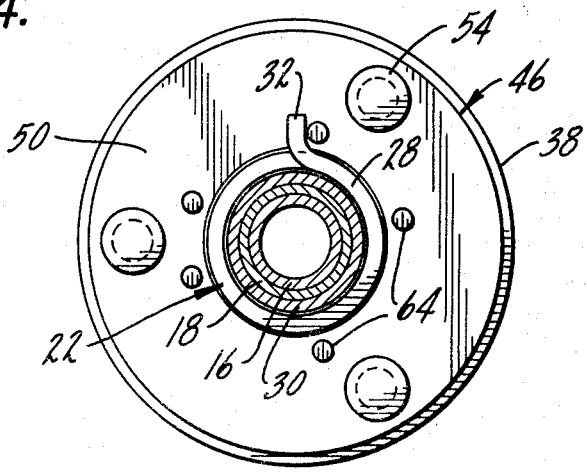

3,684,068

ELECTROMECHANICAL CLUTCH

SUMMARY OF THE INVENTION

The present invention relates to an electromagnetic clutch using a coil spring as a coupling between an input shaft and an output shaft.

A primary purpose of the invention is a reliably operable simply constructed electromagnetic clutch of the type described.

Another purpose is an electromagnetic clutch in which the spring normally forming the driving connection between the input and the output is held against rotation by engagement between a portion of the spring and the armature.

Another purpose is a clutch of the type described in which the movable armature has a surface arranged for engagement with a portion of the spring to uncouple the input and output shafts.

Another purpose is a clutch of the type described which connects the input and output shafts when the armature moves away from the coil spring forming the driving connection.

Another purpose is an electromagnetic clutch in which the spring forming the driving connection between the input and output members has an outwardly directed tab in engagement with the armature, with the spring tab being released when the electromagnet is operated.

Another purpose is a clutch of the type described in which the coil spring forming the driving connection between the input and outputs includes a coil, larger than those forming the driving connection, and positioned for frictional engagement with the armature to prevent rotation of the spring.

Other purposes will appear in the ensuing specification, drawings and claims.

BRIEF DESCRIPTION OF THE DRAWINGS

The invention is illustrated diagrammatically in the following drawings wherein:

FIG. 4 is an end view of the armature of a further modified form of the invention.

DESCRIPTION OF THE PREFERRED EMBODIMENT

Figures 1, 2, 3:
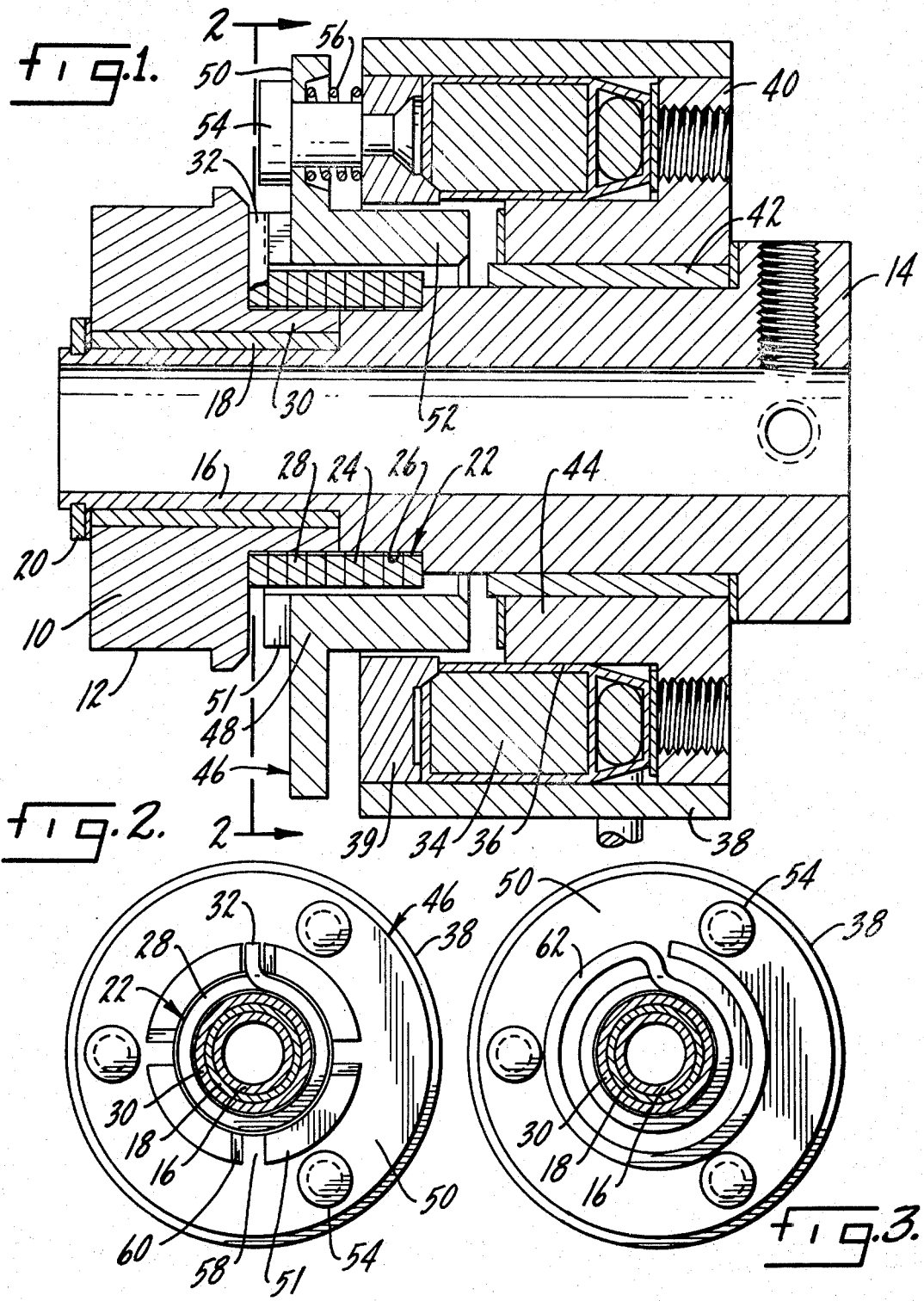
FIG. 1 is an axial section through a clutch of the type described.
FIG. 2 is a section along plane 2—2 of FIG. 1.
FIG. 3 is an end view of the armature of a modified form of the invention.

The present invention is useful in coupling a normally continuously running input member, for example a shaft, to a normally stationary output member. The principles disclosed herein are also applicable to a brake construction.

In FIG. 1, an input member or hub or shaft 10 has a surface 12 which may receive a belt or some other form of driving device so that the hub 10 is continuously rotated. A concentric output shaft is indicated at 14 and has an axially extending portion 16 which passes through the hub 10 and is separated from the hub by a cylindrical bearing 18. The input shaft or hub 10 and the output shaft 14 can be independently rotated or one can rotate relative to the other in the construction shown. A washer or ring or the like 20 is used to hold the hub 10 onto the shaft 14.

A helical flat wire coil spring 22 has coils 24 wound about a shoulder 26 of the output shaft 14 and has coils 28 which are wound about a concentric shoulder 30 on the hub 10. The inside dimension of the spring 22 is held in close tolerance to the exterior dimensions of the shoulders 26 and 30 so that the spring 22 may form the driving connection between the hub and the output shaft. The spring 22 may have a radially outwardly extending tab 32 illustrated in FIG. 2 for a purpose to be described hereinafter.

The coil assembly for the electromagnet is indicated at 34 and is annular in configuration and concentric with and positioned about the output shaft 14. The coil 34 is positioned within a chamber 36 defined by a cylindrical cover 38 on the outside, an inner base 39 and an end base assembly 40. A bearing 42 is positioned between the inwardly-directed portion 44 of the base 40 and the output shaft 14.

The armature is indicated generally at 46 and includes an annular portion 48 having an annular surface 50. An inwardly-directed annular shoulder or projection 52 extends toward the shoulder 44 of the base 40 and in the operated position will close upon the shoulder 44. The armature is attached to the electromagnet by means of a plurality of pins 54, each encircled by small coil springs 56. The springs 56 normally bias the armature away from the electromagnet and maintain the gap between the shoulder 52 and the shoulder 44. The force of the springs is overcome and the gap is closed when the electromagnet is operated.

The surface 50 of the armature carries a ring 51 which has a plurality of recesses or grooves 58 positioned to hold the spring tab 32. As shown in FIG. 2, there may be four such grooves, although the invention should not be limited to any particular number nor to any particular spacing or position of the grooves. The back side of each of the grooves 58 has a slanted surface 60 so that the spring tab 32 may slide into the groove at the end of each stroke of the clutch. The slanted surfaces 60 are also effective to permit the spring tab to back out of a groove if the direction of rotation of the hub 10 should be reversed.

In operation, and assuming the invention is utilized as a clutch, the hub 10 will be continuously rotating in one direction. The spring 22 will be fixed against rotation because tab 32 will be positioned in one of the grooves 58. Accordingly, there will be no rotation of the output shaft 14 even though the spring 22 is closely wound upon both the input and output shafts. When coil 34 is provided with electric power, the force of springs 56 will be overcome and the armature 46 will move toward the electromagnet releasing the spring tab 32 from one of the grooves 58. Spring 22 will then provide a coupling between the input and output and there will be rotation of the output shaft 14 with the hub 10. At such time as the power to the coil 34 is stopped, the armature 46 will return to the position shown in FIG. 1. The spring 22 and output shaft 14 will continue to rotate until such time as tab 32 moves into one of the grooves 58. The spring will then stop rotating and there will be no further e driving connection between the input and output shafts. The number of grooves 58 is only important in that a greater number of grooves permits less rotation of the output shaft after de-energizing of the coil 34.

FIG. 3 illustrates a modification of the invention in which the spring tab 32 is replaced by a coil 62 having a radius greater than that of the coils 24 and 28. The coil 62 will be in frictional engagement with the armature surface 50 to prevent rotation of the spring and thus the output shaft. At such time as the armature is moved away from coil 62, the spring will be free to rotate and to form a coupling between the input and the output. One advantage of utilizing a construction such as the coil 62 is that as soon as power is removed from the electromagnet 34, the output shaft will immediately stop rotation as the frictional engagement between the surface 50 and the coil 62 will prevent further movement of the spring. Thus there will be no overrun as may take place when there are a given number of grooves and the output shaft and spring will not stop rotating until the tab 32 moves into one of the grooves.

In the armature of FIG. 4, there are a plurality of stops or pins 64 extending outwardly from the surface 50 and positioned for contact with spring tab 32. The pins 64 are effective to stop the armature at specific angular positions when power to the coil is stopped. For this reason pin spacing may be non-uniform, as shown. The structure of FIG. 4 will operate in the same manner as the structure of FIGS. 1 and 2, except that the hub 10 cannot rotate in the reverse direction a distance greater than the space between adjacent pins.

Although the invention has been described and shown performing a clutching function, it should be obvious that the structure shown can be arranged for a braking application.

Whereas the preferred form of the invention has been shown and described herein, it should be realized that there may be many modifications, substitutions and alterations thereto.

I claim:

1. An electromagnetic coupling device including an input member, an output member concentric with said input member, a coil spring having portions wound about said input and output members for forming a driving connection therebetween, an electromagnet concentric with said members, an armature adjacent said electromagnet, yielding means normally biasing said armature away from said electromagnet, said coil spring having a portion thereof positioned for engagement with said armature, with engagement of the spring by the armature preventing rotation of the spring to uncouple said input and output members, operation of said electromagnet moving said armature to change the relationship between said spring portion and armature.

2. The structure of claim 1 further characterized by and including at least one recess in the armature surface adjacent said spring portion, with said spring portion being arranged to be positioned in said recess to engage the spring and armature.

3. The structure of claim 1 further characterized in that said armature has an annular surface concentric with said electromagnet, said annular surface being positioned adjacent said spring portion and having a plurality of recesses arranged to receive said spring portion.

4. The structure of claim 3 further characterized in that said recesses are generally equally spaced about said armature annular surface.

5. The structure of claim 3 further characterized in that said recesses each have a slanted surface positioned to permit said spring portion to slide into a recess.

6. The structure of claim 3 further characterized in that said spring portion includes an outwardly directed spring tab.

7. The structure of claim 1 further characterized in that said spring portion includes at least a part of a coil, having a radius greater than that of the coil portions forming the driving connection between the input and output members.

8. An electromagnetic clutch including a normally running input shaft, a normally stationary output shaft concentric with said input shaft, a coil spring having portions wound about said input and output shafts and arranged to form a driving connection therebetween, an electromagnet concentric with said shafts and positioned about said output shaft, an annular armature adjacent said electromagnet, yielding means normally biasing said armature away from said electromagnet and toward said input shaft, said coil spring having a portion thereof positioned for engagement with said armature when the electromagnet is de-energized, engagement of the spring by the armature preventing rotation of the spring and uncoupling said input and output shafts, operation of said electromagnet moving said armature away from said spring portion permitting the spring to form a driving connection between the input and output shafts.

9. The structure of claim 8 further characterized in that the yielding means normally biasing said armature away from said electromagnet includes a plurality of spaced springs positioned between the electromagnet and armature.

10. The structure of claim 9 further characterized by and including a plurality of pins connecting said armature and electromagnet, with said springs being positioned about said pins and between the armature and electromagnet.

11. The structure of claim 8 further characterized in that said spring portion includes a spring tab, and a plurality of grooves in an annular surface of said armature adjacent said spring tab, with said tab being arranged to be positioned in one of said grooves to engage the spring with the armature and prevent rotation of the spring.

12. The structure of claim 8 further characterized in that said spring portion includes at least a part of a spring coil having a radius greater than that of the coils forming the driving connection between the input and output shafts.

13. The structure of claim 8 further characterized by a plurality of stops extending outwardly from said armature and positioned for engagement with said spring portion.

* * * * *